Figure 1:
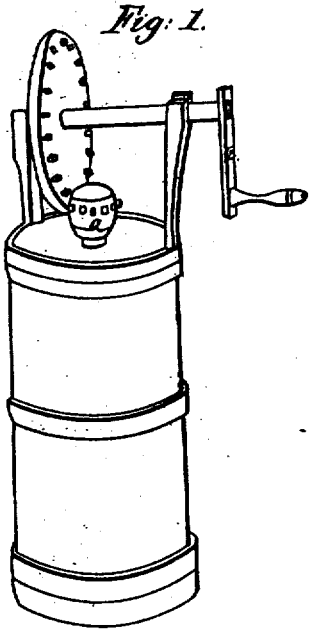
Figure 2:
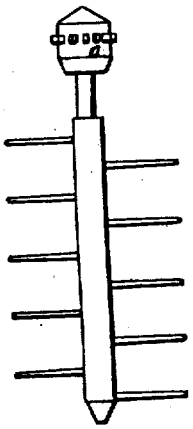

8975½X

R. RYERSON.

CHURN.

Patented July 17, 1835.

THE NORRIS PETERS CO., PHOTO-LITHO., WASHINGTON, D. C.

July 17, 1835 8975 1/2X 3/3

Reding Ryerson: Oxford Co. Maine

Letters Patent

The Schedule referred to in these Letters Patent and making part of the same containing a description in the words of the said Reding Ryerson himself of his improvement in cutting floats of the common churn To all to whom these presents shall come.

Be it known, that I Reding Reyerson of Jay in the County of Oxford and State of Maine have invented a new and useful improvement in the dash of the common churn for making butter. and that the following is a full and exact description of the construction and operation of said dash which consists of cutting floats as invented by me. the churn to which said dash or cutting floats is applied is in form round constructed of staves and hoops standing in an upright or perpendicular position about two feet in hight the shaft to which the cutting floats are connected is made round with a trundle head at the upper end a sufficient distance above the cover of the churn to admit a cog wheel which mashes into the trundle head that propels the shaft. The shaft passes through the centre of the cover into a socket fixed in the centre of the bottom of the churn inside. There are two ways in which the cutting floats are used and applied to the churn, one horizontally the other perpendicularly. The horizontal floats consist of about eight (which number is governed by the height of the churn) fixed to the shaft four on the two opposite sides. or a quarter round cutting about two inches from each other as they pass round. the other dash or cutting floats is in the following form. the shaft passes through a piece of wood under the cover about one and a half inch wide into which are tenoned three or four cutting floats (which number are regulated according to the size of the churn) that pass to the bottom of the churn standing perpendicular with the shaft, they may be 8975 1/2 X all on one side of the shaft or half or more on each side in such posi tion as to cut between each other as they pass round. On the outside of the churn that is in common use are placed two standards exactly opposite to each other perpendicularly extending sufficiently high above the top of the churn to admit a cog wheel with an axletree that passes through the centre which mashes into the trundle head on the top of the shaft at the end of the ax (which is placed horizon tally on the top of the standards) is a cramk by turning that the shaft to which the cutting floats are connected is propelled round with great velocity. The improvement on the common churn by cutting floats either placed perpendicularly or horizontally as above specified has been found by experience in the use of the same to be superior to any other that is known to be in operation. horizontal floats and single perpendicular floats constitute the cutting. the improvement specially made and the manner in which they are arranged are both the invention of the subscriber Jay Me. April 23d 1835

Witnesses
Henry West
James Hare

Reding Reyerson

[illegible]

552 wds (Patented July 17th 1835)

(Drawing)